United States Patent
Edwards et al.

(10) Patent No.: US 7,995,254 B2
(45) Date of Patent: Aug. 9, 2011

(54) IMAGING APPARATUS HAVING SCAN LID SENSING

(75) Inventors: Mark Joseph Edwards, Lexington, KY (US); Ricky Earl Robbins, Danville, KY (US)

(73) Assignee: Lexmark International, Inc., Lexington, KY (US)

(*) Notice: Subject to any disclaimer, the term of this patent is extended or adjusted under 35 U.S.C. 154(b) by 923 days.

(21) Appl. No.: 11/946,399

(22) Filed: Nov. 28, 2007

(65) Prior Publication Data
US 2009/0135456 A1    May 28, 2009

(51) Int. Cl.
*H04N 1/04*    (2006.01)

(52) U.S. Cl. ........ 358/497; 358/486; 358/488; 358/474; 399/379; 399/380

(58) Field of Classification Search .................. 358/486, 358/497, 474, 494, 488, 505; 399/211, 212, 399/379, 380; 250/239, 234, 235; 382/318, 382/319, 312

See application file for complete search history.

(56) References Cited

U.S. PATENT DOCUMENTS

| | | | | | |
|---|---|---|---|---|---|
| 4,459,673 | A | * | 7/1984 | Shibazaki et al. | 704/274 |
| 5,900,950 | A | * | 5/1999 | Hsu | 358/497 |
| 6,734,996 | B1 | * | 5/2004 | Lee | 358/486 |
| 7,136,199 | B2 | * | 11/2006 | Cantwell | 358/474 |
| 7,676,189 | B2 | * | 3/2010 | Seo | 399/380 |

* cited by examiner

*Primary Examiner* — Cheukfan Lee
(74) *Attorney, Agent, or Firm* — John Victor Pezdek

(57) ABSTRACT

An imaging apparatus includes a scan bar having a scanner head. A drive mechanism is drivably coupled to the scan bar. A controller is communicatively coupled to the scanner head and the drive mechanism. A scanner body has a cover defining a scanner opening in which a document glass is mounted. The scan bar is located below the cover. The scanner body has a home position opening separate from the scanner opening that passes through the cover. A scanner lid is pivotably coupled to the scanner body. The scanner lid has a home protrusion located for mating engagement with the home position opening of the scanner body when the scanner lid is closed to define a home position for the scanner head.

20 Claims, 3 Drawing Sheets

IMAGING APPARATUS HAVING SCAN LID SENSING

CROSS-REFERENCE TO RELATED APPLICATIONS

None.

MICROFICHE APPENDIX

None.

GOVERNMENT RIGHTS IN PATENT

None.

BACKGROUND OF THE INVENTION

1. Field of the Invention

The present invention relates to imaging, and, more particularly, to an imaging apparatus having scan lid sensing.

2. Description of the Related Art

An imaging apparatus in the form of a scanner is used to generate a digital representation of a document being scanned. Such a document may include any of a variety of media types, such as paper, card stock, etc., and may be regular (e.g., rectangular) or irregular in shape, and on which there is formed, for example, text, graphics or a picture, e.g., a photo, or a combination thereof. In one application of a scanner, known in the art as "True Copy", a pre-scan of the target document (e.g., original) is performed at reduced resolution to determine its content type and color qualities. The print/scan settings then are adjusted based on that determination, the document is rescanned at an optimal resolution, and then the rescanned image is printed.

Typically, the target document is pre-scanned from the bottom of the page up, which eliminates the need to return the scan bar to the top of the page before final scanning begins. This requires that the scanner park the scan bar at a position at the bottom of the page. However, typically, the scanner calibrates to a home position at the top of the page, and thus may lose positional accuracy by the time the scan bar reaches the bottom of the page.

SUMMARY OF THE INVENTION

The present invention provides scan lid sensing that may be implemented at low or no additional cost, and which aids in determining a home position, such as a pre-scan home position, and also may be used to determine when the scanner lid is open and for triggering pre-scan events.

The invention, in one form thereof, is directed to an imaging apparatus. The imaging apparatus includes a scan bar having a scanner head. A drive mechanism is drivably coupled to the scan bar. A controller is communicatively coupled to the scanner head and the drive mechanism. A scanner body has a cover defining a scanner opening in which a document glass is mounted. The scan bar is located below the cover. The scanner body has a home position opening separate from the scanner opening that passes through the cover. A scanner lid is pivotably coupled to the scanner body. The scanner lid has a home protrusion located for mating engagement with the home position opening of the scanner body when the scanner lid is closed to define a home position for the scanner head.

The invention, in another form thereof, is directed to an imaging apparatus. The imaging apparatus includes a scan bar having a scanner head. A drive mechanism is drivably coupled to the scan bar. A controller is communicatively coupled to the scanner head and the drive mechanism. A scanner body has a cover defining a scanner opening in which a document glass is mounted. The scan bar is located below the cover. The scanner body has a home position opening separate from the scanner opening that passes through the cover. The scanner body includes a top of page position at one end of the document glass and a bottom of page position at an opposite end of the document glass. A scanner lid is pivotably coupled to the scanner body. The scanner lid has a home protrusion located for mating engagement with the home position opening of the scanner body when the scanner lid is closed to define a pre-scan home position for the scanner head associated with a pre-scan operation. The pre-scan home position is located beyond the bottom of page position in a direction from the top of page position toward bottom of page position. The pre-scan operation is a scan performed at reduced resolution, in comparison to a normal scan resolution, to determine a content type and color qualities of a target document positioned on the document glass.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
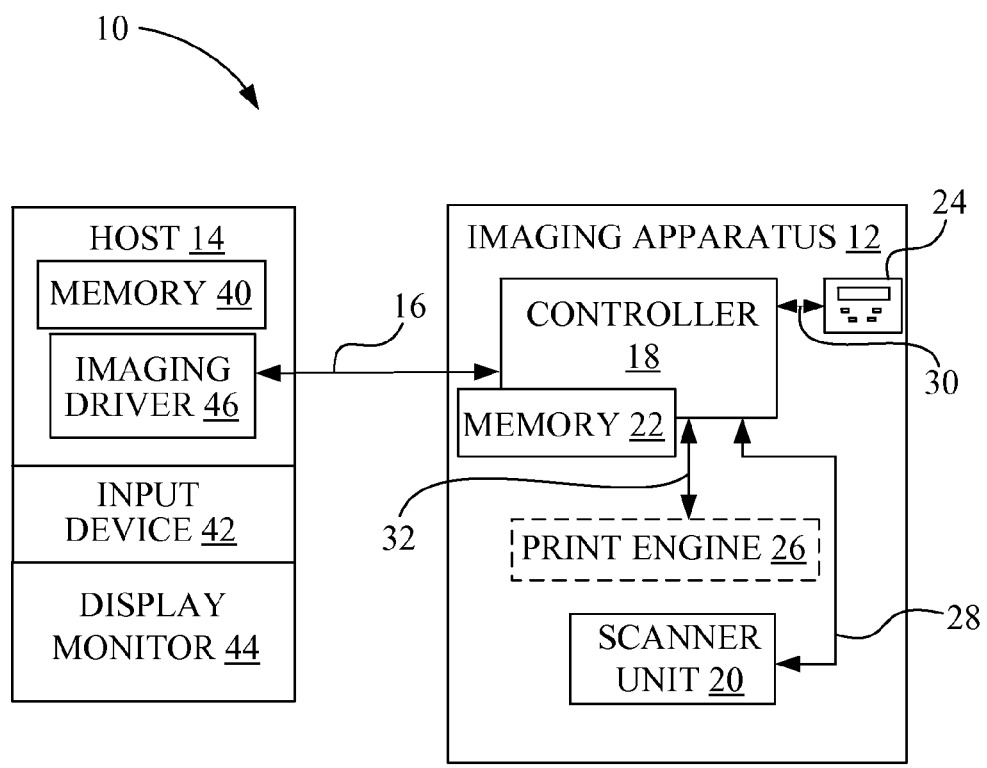
FIG. 1 is a diagrammatic depiction of an imaging system embodying the present invention.

Referring now to the drawings and particularly to FIG. 1, there is shown a diagrammatic depiction of an imaging system 10 embodying the present invention.

Imaging system 10 may include an imaging apparatus 12 and a host 14. Imaging apparatus 12 communicates with host 14 via a communications link 16. As used herein, the term "communications link" is used to generally refer to structure that facilitates electronic communication between multiple components, and may operate using wired or wireless technology. Imaging apparatus 12 may communicate with host 14 via a standard communication protocol, such as for example, universal serial bus (USB), Ethernet or IEEE 802.xx.

In the exemplary embodiment of FIG. 1, imaging apparatus 12 includes a controller 18, a scanner unit 20, memory 22, and a user interface 24. Optionally, as indicated by dashed lines, imaging apparatus 12 may also include a print engine 26 for performing a printing function. Print engine 26 may accommodate, for example, ink jet printing, electrophotographic printing, thermal transfer printing, etc. Thus, in the context of the present invention, it is to be understood that imaging apparatus 12 may be a scanner, a scanner-copier, a scanner-printer-copier, and may include other functionality, such as facsimile capability to form an All-In-One (AIO) machine.

Controller 18 includes a processor unit and associated memory 22, and may be formed as one or more Application Specific Integrated Circuits (ASIC). Memory 22 may be, for example, random access memory (RAM), read only memory (ROM), and/or non-volatile RAM (NVRAM). Alternatively, memory 22 may be in the form of a separate electronic memory (e.g., RAM, ROM, and/or NVRAM), a hard drive, a CD or DVD drive, or any memory device convenient for use with controller 18. Controller 18 is a scanner controller, and in some embodiments may be a combined printer and scanner controller.

In the present embodiment, controller 18 communicates with scanner unit 20 via a communications link 28. User interface 24 is communicatively coupled to controller 18 via a communications link 30. Optional print engine 26 is communicatively coupled to controller 18 via a communications link 32. Controller 18 serves to operate scanner unit 20 and process data obtained via scanner unit 20. In addition, optionally, controller 18 executes program instructions to process print data and to operate print engine 26 during printing.

Host 14, which may be optional, may be, for example, a personal computer, including memory 40, such as RAM, ROM, and/or NVRAM, an input device 42, such as a keyboard, and a display monitor 44. Host 14 further includes a processor, input/output (I/O) interfaces, and at least one mass data storage device, such as a hard drive, a CD-ROM and/or a DVD unit.

Host 14 may include in its memory a software program including program instructions that function as an imaging driver 46, e.g., scanner and/or printer driver software, for imaging apparatus 12. Imaging driver 46 is in communication with controller 18 of imaging apparatus 12 via communications link 16. Imaging driver 46 facilitates communication between imaging apparatus 12 and host 14.

In some circumstances, it may be desirable to operate imaging apparatus 12 in a standalone mode. In the standalone mode, imaging apparatus 12 is capable of functioning without host 14. Accordingly, all or a portion of imaging driver 46, or a similar driver, may be located in controller 18 of imaging apparatus 12 so as to accommodate scanning, copying, and/or printing operations being handled by imaging apparatus 12 when operating in the standalone mode.

Figure 2:
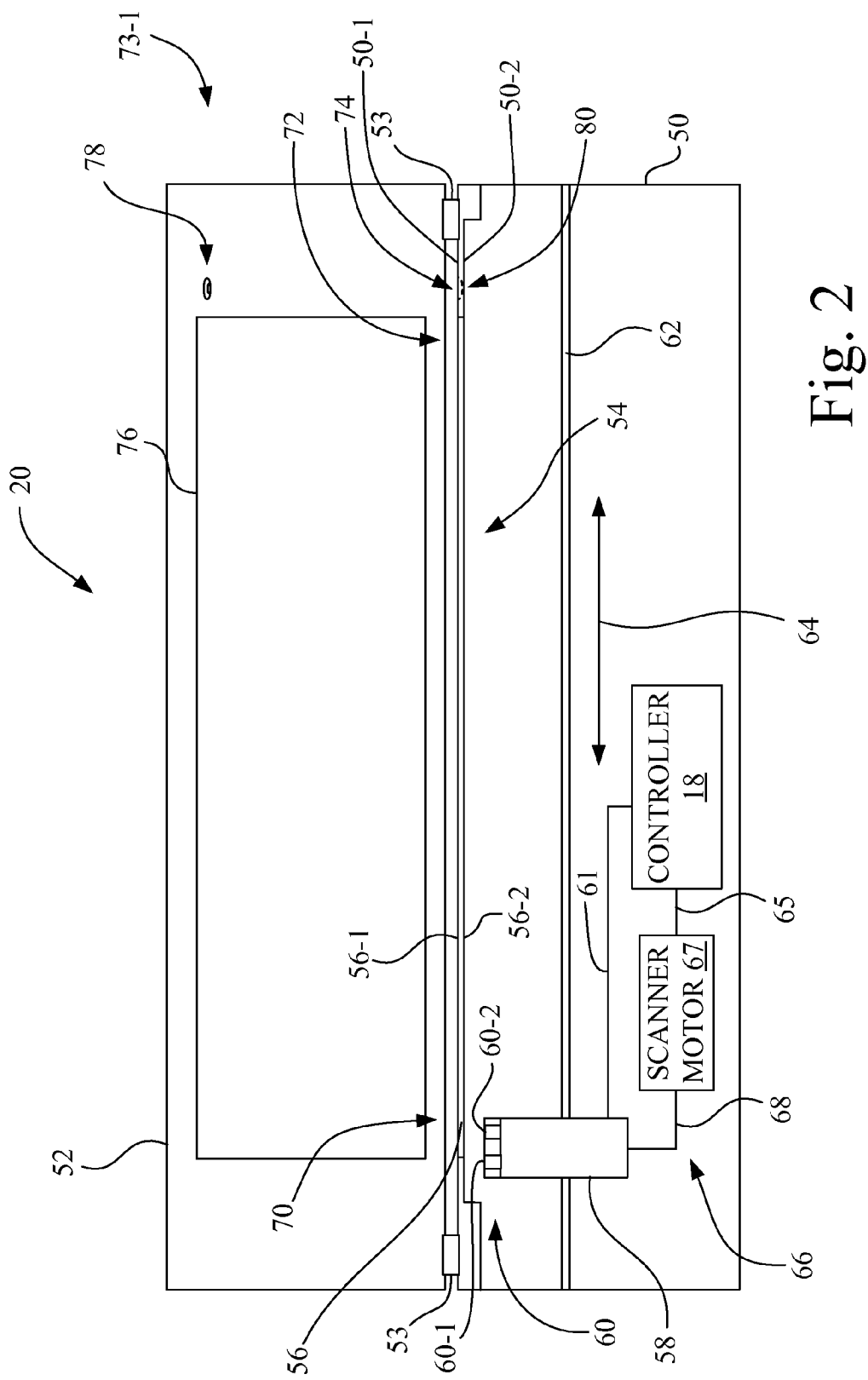
FIG. 2 is a diagrammatic representation of an embodiment of the scanner unit used in the imaging system of FIG. 1, with the scanner lid in the open position.

Referring to FIG. 2, there is shown an embodiment of the present invention where scanner unit 20 is a flat bed scanner. Scanner unit 20 includes a scanner body 50 and a scanner lid 52. Scanner lid 52 is pivotably coupled by hinges 53 to scanner body 50. Scanner body 50 has a cover 50-1 that defines a scanner opening 54 facing scanner lid 52, in which a document glass 56 is mounted. Document glass 56 includes an upper surface 56-1 facing toward scanner lid 52, and a back surface 56-2 facing away from scanner lid 52. A target document 57 (see FIG. 3) to be scanned is positioned face-down on upper surface 56-1 of document glass 56 and is supported thereby.

A scan bar 58 is located below cover 50-1 of scanner body 50. Scan bar 58 includes a scanner head 60. Scanner head 60 includes a light source 60-1 and an image sensor 60-2. Light source 60-1 may be, for example, a light bar having one or more lamps, or LED arrays. Image sensor 60-2 may be, for example, a linear array of one or more reflectance sensor arrangements. Each of light source 60-1 and image sensor 60-2 is positioned to face back surface 56-2, e.g., the under side, of document glass 56. Each of light source 60-1 and image sensor 60-2 is communicatively coupled to controller 18 by a communication link 61.

Scan bar 58 is slidably coupled to a longitudinal guide member 62 for movement along bi-directional scan directions 64. As schematically illustrated in FIG. 2, scan bar 58 is drivably coupled to drive mechanism 66, including a scanner motor 67 and a drive train 68, to effect a scanning movement of scan bar 58, and in turn scanner head 60, along guide member 62. The scanning movement may be, for example, from a top of page position 70 at one end of document glass 56 to a bottom of page position 72 at an opposite end of document glass 56 during a normal scan operation, or vice versa during a pre-scan operation.

Drive mechanism 66 is communicatively coupled, e.g., by an electrical cable 65, to controller 18, with controller 18 providing signals to drive mechanism 66 to effect a scanning operation, e.g., either of a pre-scan operation or a normal scan operation. Drive train 68 of drive mechanism 66 may include, for example, belts, pulleys, gears, etc. that are coupled to scanner motor 67 for effecting the scanning movement of scan bar 58.

Figure 3:
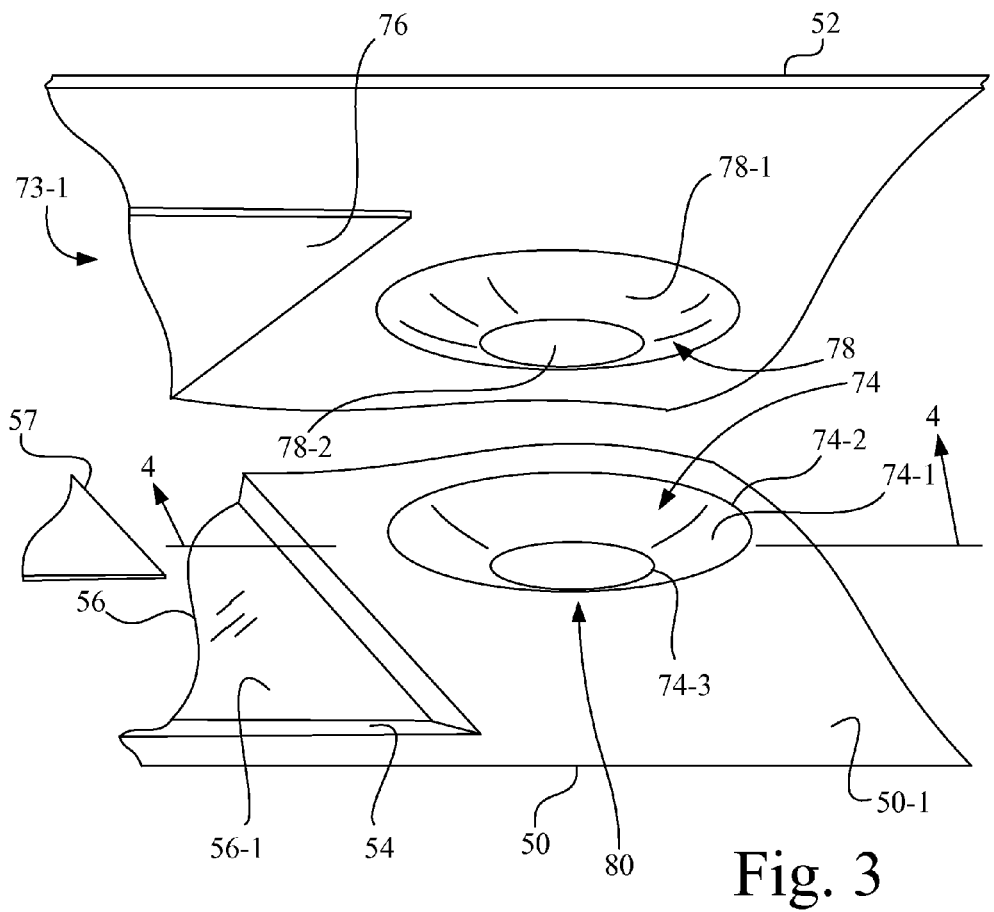
FIG. 3 is an enlarged portion of the scanner unit of FIG. 2, showing the home position opening of the scanner body and the home protrusion of the scanner lid.
Figure 4:
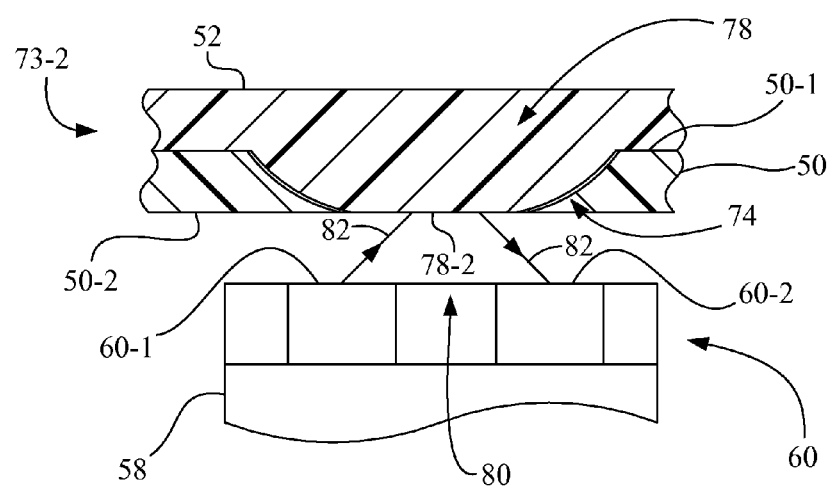
FIG. 4 is a side section view of a portion of the scanner unit of FIG. 3 taken along line 4-4, with the scanner lid in the closed position.

FIGS. 2 and 3 show scanner lid 52 in an open position 73-1, and FIG. 4 shows scanner lid 52 in the closed position 73-2.

As shown in FIGS. 2-4, scanner body 50 further includes a home position opening 74 that is formed through cover 50-1 of scanner body 50. Home position opening 74 may be formed, for example, during the molding of cover 50-1, or alternatively, by a machining process. Home position opening 74 is formed as a tapered depression that passes through cover 50-1. In the present embodiment, for example, home position opening 74 is formed as a concave depression that passes through cover 50-1 of scanner body 50 to form an interior side wall 74-1 that tapers between a top opening 74-2 and a bottom opening 74-3. In the present embodiment, interior side wall 74-1 has a continuous curved-circular shape extending from top opening 74-2 to bottom opening 74-3, with top opening 74-2 being larger than bottom opening 74-3. Thus, in the present embodiment, home position opening 74 has a somewhat flattened hemispherical inner shape.

As shown in FIGS. 2 and 3, a document pad 76 is affixed to scanner lid 52, and is positioned to face upper surface 56-1 of document glass 56 when scanner lid 52 is closed, with respect to scanner body 50. Scanner lid 52 further includes a home protrusion 78 located for mating engagement with home position opening 74 when scanner lid 52 is closed, as illustrated in FIG. 4. Home protrusion 78 may be formed, for example, during the molding of scanner lid 52, or alternatively, may be attached to scanner lid 52 by a fastener, such as an adhesive.

In the present embodiment, home protrusion 78 includes a domed-shaped outer sidewall 78-1 that terminates in a reflective surface 78-2. In the present embodiment, reflective surface 78-2 is shown as being a flat surface, thereby giving home protrusion a somewhat flattened hemispherical outer shape. While in the present embodiment reflective surface 78-2 is flat, it is contemplated that reflective surface 78-2 may be, for example, crowned or depressed. Reflective surface 78-2 is highly reflective, and has a color that is lighter in contrast to the darkness of the bottom area 50-2 of cover 50-1 that surrounds bottom opening 74-3 of home position opening 74. For example, reflective surface 78-2 may be white, or a silver or gold mirror finish, whereas the bottom area 50-2 of cover 50-1 may be a dark color (e.g., gray to black), or cover 50-1 may be formed in its entirety from a dark plastic, such as plastic that is of a color that is gray to black. Thus, the amount (e.g., intensity) of light reflected off of reflective surface 78-2 will be significantly greater than the amount of light reflected off of bottom area 50-2 of cover 50-1 of sensor body 50.

When scanner lid 52 is moved from the open position 73-1, as shown in FIGS. 2 and 3, to the closed position 73-2 shown in FIG. 4, home protrusion 78 is received by home position opening 74, with outer sidewall 78-1 of home protrusion 78 engaging interior side wall 74-1 of home position opening 74, thereby positioning, e.g., centering, reflective surface 78-2 in bottom opening 74-3 of home position opening 74. In this arrangement, reflective surface 78-2 defines a pre-scan home position 80 for scanner head 60 and scan bar 58, with the pre-scan home position 80 being located beyond the bottom of page position 72 in the direction from the top of page position 70 toward the bottom of page position 72.

In the embodiment described above, while home position opening 74 and home protrusion 78 are shown and described as having mating flattened hemispherical shapes, those skilled in the art will recognize that other shapes, such as mating frusto-conical shapes, may be used and still get the centering effect of home protrusion 78 engaging home position opening 74 by providing a taper for interior side wall 74-1, so as to locate reflective surface 78-2 in bottom opening 74-3 of home position opening 74.

During a homing operation, controller 18 executes program instructions to command drive mechanism 66 to move scan bar 58, with controller 18 executing program instructions to read scanner head 60 as scan bar 58 is moved to detect the home position, e.g., pre-scan home position 80. More particularly, for example, drive mechanism 66 moves scan bar 58 toward the bottom of page position 72. Once scan bar 58 passes the bottom of page position 72, i.e., moves past the end of scanner opening 54, then scanner head 60 begins to sense for the high contrast of reflective surface 78-2 relative to bottom area 50-2 of cover 50-1 of scanner body 50.

For example, light source 60-1 of scanner head 60 emits light 82. By measuring the intensity of reflected light 82 received by image sensor 60-2, the location of reflective surface 78-2 will be determined by a noticeable spike in light intensity in comparison to the light intensity reflected from bottom area 50-2 of cover 50-1, thereby designating pre-scan home position 80. As a more specific example, assume that image sensor 60-2 of scanner head 60 is 5100 pixels wide. A result indicative of pre-scan home position 80 may be, for example, pixels 1-3000 are dark (corresponding to bottom area 50-2 of cover 50-1), pixels 3001-3150 are a consistent bright white (corresponding to reflective surface 78-2), and pixels 3151-5100 are dark (also corresponding to bottom area 50-2 of cover 50-1).

Once the location of reflective surface 78-2 is determined, controller 18 commands the movement of scan bar 58 to stop, such that scanner head 60 is positioned at pre-scan home position 80, i.e., vertically below home position opening 74.

At an ancillary feature, while scanner head 60 is positioned stationary at pre-scan home position 80, i.e., with scanner head 60 positioned below home position opening 74, a determination of whether scanner lid 52 is opened, i.e., moved from the closed position 73-2 to the open position 73-1, may be made by controller 18 by sensing a reduction in light intensity sensed by scanner head 60 when reflective surface 78-2 of home protrusion 78 is lifted out of home position opening 74 as scanner lid 52 is opened.

For example, if sensor head 60 detects pixels 1-3000 to be dark, pixels 3001-3150 to be other-than-white and not consistent, and pixels 3151-5100 to be dark, then controller 18 may determine that scanner lid 52 is in open position 73-1.

Likewise, while scanner head 60 is positioned stationary at pre-scan home position 80, i.e., with scanner head 60 positioned below home position opening 74, a determination of whether scanner lid 52 is closed, i.e., moved from the open position 73-1 to the closed position 73-2, may be made by controller 18 by sensing an increase in light intensity sensed by scanner head 60 as reflective surface 78-2 of home protrusion 78 is re-inserted in home position opening 74 as scanner lid 52 is closed.

For instance, if sensor head 60 detects pixels 1-3000 to be dark, pixels 3001-3150 to be a consistent bright white, and pixels 3151-5100 to be dark, then controller 18 may determine that scanner lid 52 is in closed position 73-2.

If controller 18, subsequent to scanner lid 52 transitioned from closed position 73-2 to open position 73-1, determines that scanner lid 52 has transitioned from open position 73-1 to closed position 73-2, controller 18 may then execute program instructions to automatically begin a pre-scan operation. The pre-scan operation is a scan of a target document (e.g., an original document), such as target document 57 positioned on document glass 56, with the scan being performed at reduced resolution, in comparison to a normal scan resolution, to determine the content type and color qualities of the target document.

Thereafter, after a predetermined amount of time, if controller 18 does not determine that a further transition of scanner lid 52 from the closed position 73-2 to the open position 73-1 has occurred, then imaging apparatus 12 may automatically provide a message, e.g., via user interface 24, to the user to remove the target document from document glass 56.

Alternatively, it is contemplated that the opening and closing of scanner lid 52 may be detected by other sensing mechanisms, such as by sensing a different reflective surface, by using a scanner lid sensor switch, etc.

While the embodiment described above uses a light colored reflective surface 78-2 in contrast to a relatively darker background provided by bottom area 50-2 of cover 50-1, those skilled in the art will recognize that the invention may be modified to provide other contrasting colors as between surface 78-2 and bottom area 50-2 of cover 50-1 for home position detection. For example, it is contemplated that surface 78-2 may be a color other than white, e.g., yellow, red, etc., so long as a distinguishing contrast is made with bottom area 50-2 of cover 50-1. For example, the colors of surface 78-2 and bottom area 50-2 of cover 50-1 may be reversed, such that bottom area 50-2 is light, e.g., white, and surface 78-2 is dark, e.g., grey or black, without departing from the spirit of the present invention.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An imaging apparatus, comprising:
a scan bar having a scanner head;
a drive mechanism drivably coupled to said scan bar;
a controller communicatively coupled to said scanner head and said drive mechanism;
a scanner body having a cover defining a scanner opening in which a document glass is mounted, said scan bar being located below said cover, and said scanner body having a home position opening separate from said scanner opening that passes through said cover; and a scanner lid pivotably coupled to said scanner body, said scanner lid having a home protrusion located for mating engagement with said home position opening of said scanner body when said scanner lid is closed to define a home position for said scanner head, wherein said home position opening is formed as a tapered depression in said cover, said home position protrusion has a shape corresponding to that of said home position opening, and said home position protrusion has a surface that is exposed through said home position opening to said scanner head when said scanner head passes under said home position opening.

2. The imaging apparatus of claim 1, wherein said tapered depression is a concave depression that passes through said cover of said scanner body to form an interior side wall that tapers between a top opening in said cover and a bottom opening in said cover, with said top opening being larger than said bottom opening.

3. The imaging apparatus of claim 2, wherein said home protrusion includes a domed-shaped outer sidewall that terminates in a reflective surface.

4. The imaging apparatus of claim 3, wherein said reflective surface is a flat surface.

5. The imaging apparatus of claim 1, including a top of page position at one end of said document glass and a bottom of page position at an opposite end of said document glass, and wherein said home position is located beyond said bottom of page position in a direction from said top of page position toward said bottom of page position.

6. The imaging apparatus of claim 5, wherein said home position is a pre-scan home position.

7. The imaging apparatus of claim 1, wherein said drive mechanism is configured to move said scan bar at a command of said controller, said controller executing program instructions to read said scanner head as said scan bar is moved to detect said home position and position said scanner head at said home position.

8. The imaging apparatus of claim 7, wherein while said scanner head is positioned stationary at said home position, said controller determines whether said scanner lid has transitioned from a closed position to an open position by sensing a reduction in light intensity sensed by said scanner head when a reflective surface of said home protrusion is lifted out of said home position opening as said scanner lid is opened.

9. The imaging apparatus of claim 8, wherein when said controller subsequently determines that said scanner lid has transitioned from said open position to said closed position, then said controller executes program instructions to automatically begin a pre-scan operation associated with a target document positioned on said document glass.

10. The imaging apparatus of claim 9, wherein thereafter, after a predetermined amount of time, if said controller does not determine a further transition of said scanner lid from said closed position to said open position, said imaging apparatus automatically provides a message to said user to remove said target document from said document glass.

11. The imaging apparatus of claim 7, wherein while said scanner head is positioned at said home position, said controller determines whether said scanner lid has transitioned from a closed position to an open position, and when said controller subsequently determines that said scanner lid has transitioned from said open position to said closed position, then said controller executes program instructions to automatically begin a pre-scan operation associated with a target document positioned on said document glass.

12. The imaging apparatus of claim 11, wherein thereafter, after a predetermined amount of time, if said controller does not determine a further transition of said scanner lid from said closed position to said open position, said imaging apparatus automatically provides a message to said user to remove said target document from said document glass.

13. An imaging apparatus, comprising:
a scan bar having a scanner head;
a drive mechanism drivably coupled to said scan bar;
a controller communicatively coupled to said scanner head and said drive mechanism;
a scanner body having a cover defining a scanner opening in which a document glass is mounted, said scan bar being located below said cover, and said scanner body having a home position opening separate from said scanner opening that passes through said cover, said scanner body including a top of page position at one end of said document glass and a bottom of page position at an opposite end of said document glass; and
a scanner lid pivotably coupled to said scanner body, said scanner lid having a home protrusion located for mating engagement with said home position opening of said scanner body when said scanner lid is closed to define a pre-scan home position for said scanner head associated with a pre-scan operation,
wherein said pre-scan home position is located beyond said bottom of page position in a direction from said top of page position toward said bottom of page position,
wherein said pre-scan operation is a scan performed at reduced resolution, in comparison to a normal scan resolution, to determine a content type and color qualities of a target document positioned on said document glass, and
wherein said home position opening is formed as a tapered depression in said cover, said home position protrusion has a shape corresponding to that of said home position opening, and said home position protrusion has a surface that is exposed through said home position opening to said scanner head when said scanner head passes under said home position opening.

14. The imaging apparatus of claim 13, wherein said tapered depression is a concave depression that passes through said cover of said scanner body to form an interior side wall that tapers between a top opening in said cover and a bottom opening in said cover, with said top opening being larger than said bottom opening, and said home protrusion includes a domed-shaped outer sidewall that terminates in a reflective surface.

15. The imaging apparatus of claim 14, wherein said reflective surface is a flat surface.

16. The imaging apparatus of claim 13, wherein said drive mechanism is configured to move said scan bar at a command of said controller, said controller executing program instructions to read said scanner head as said scan bar is moved to detect said home position and position said scanner head at said home position, wherein while said scanner head is positioned stationary at said home position, said controller determines whether said scanner lid has transitioned from a closed position to an open position by sensing a reduction in light intensity sensed by said scanner head when a reflective surface of said home protrusion is lifted out of said home position opening as said scanner lid is opened.

17. The imaging apparatus of claim 16, wherein when said controller subsequently determines that said scanner lid has transitioned from said open position to said closed position, then said controller executes program instructions to auto matically begin a pre-scan operation associated with a target document positioned on said document glass.

18. The imaging apparatus of claim 17, wherein thereafter, after a predetermined amount of time, if said controller does not determine a further transition of said scanner lid from said closed position to said open position, said imaging apparatus automatically provides a message to said user to remove said target document from said document glass.

19. The imaging apparatus of claim 13, wherein said drive mechanism is configured to move said scan bar at a command of said controller, said controller executing program instructions to read said scanner head as said scan bar is moved to detect said home position and position said scanner head at said home position, wherein while said scanner head is positioned at said home position, said controller determines whether said scanner lid has transitioned from a closed position to an open position, and when said controller subsequently determines that said scanner lid has transitioned from said open position to said closed position, then said controller executes program instructions to automatically begin a pre-scan operation associated with a target document positioned on said document glass.

20. An imaging apparatus, comprising:
a scan bar having a scanner head;
a drive mechanism drivably coupled to said scan bar;
a controller communicatively coupled to said scanner head and said drive mechanism;
a scanner body having a cover defining a scanner opening in which a document glass is mounted, said scan bar being located below said cover, and said scanner body having a home position opening separate from said scanner opening that passes through said cover;
a scanner lid pivotably coupled to said scanner body, said scanner lid having a home protrusion located for mating engagement with said home position opening of said scanner body when said scanner lid is closed to define a home position for said scanner head; and
a top of page position at one end of said document glass and a bottom of page position at an opposite end of said document glass, wherein said home position opening is located beyond said bottom of page position in a direction from said top of page position toward said bottom of page position.

* * * * *